United States Patent
Duhe et al.

(10) Patent No.: US 7,207,399 B2
(45) Date of Patent: Apr. 24, 2007

(54) MODULAR PRESSURE CONTROL AND DRILLING WASTE MANAGEMENT APPARATUS FOR SUBTERRANEAN BOREHOLE OPERATIONS

(75) Inventors: Jason Duhe, Missouri City, TX (US); James Gharst, Youngsville, LA (US); Kelvin Simon, deceased, late of Lake Arthur, LA (US); by Stella Simon, legal representative, Lake Arthur, LA (US); Paul Delahoussaye, St. Martinville, LA (US)

(73) Assignee: M-l L.L.C., Houston, TX (US)

( * ) Notice: Subject to any disclaimer, the term of this patent is extended or adjusted under 35 U.S.C. 154(b) by 0 days.

(21) Appl. No.: 11/243,232

(22) Filed: Oct. 4, 2005

(65) Prior Publication Data
US 2006/0124524 A1 Jun. 15, 2006

Related U.S. Application Data

(60) Provisional application No. 60/615,730, filed on Oct. 4, 2004, provisional application No. 60/615,715, filed on Oct. 4, 2004.

(51) Int. Cl.
*E21B 21/06* (2006.01)
(52) U.S. Cl. .................. 175/66; 175/206; 166/265; 166/75.12
(58) Field of Classification Search .............. 175/66, 175/206; 166/265, 75.12; 210/767, 787, 210/806
See application file for complete search history.

(56) References Cited

U.S. PATENT DOCUMENTS 2,417,747 A * 3/1947 Flowers ................. 494/68
3,637,012 A * 1/1972 Sizer et al. ............ 166/250.04
5,010,966 A * 4/1991 Stokley et al. ................ 175/66

(Continued)

OTHER PUBLICATIONS

M-I SWACO, TOGA System Product Bulletin, 1998, 4 pages.

*Primary Examiner*—William P Neuder
(74) *Attorney, Agent, or Firm*—M-l L.L.C.; Kimberly Ballew (57) ABSTRACT

A modularly segmented apparatus for precise borehole pressure control, removing waste from borehole fluid, and recirculating the cleaned borehole fluid includes a pressure control section, a gas separator section, and a waste management section. In the pressure control section, a pressure manifold interconnects a plurality of chokes. A plurality of valves are used to direct the contaminated fluid through one of the chokes, which maintains a precise and predetermined pressure in the system. The manifold, chokes, and valves are mounted on a skid for easy transport. In the gas separator section, a gas separator is used to remove a majority of the gases present in the contaminated borehole fluid. In the waste management section, a vibratory separator removes large solid contaminants from the degassed fluid. The solids are directed to a solids collection container for further treatment or disposal. The fluid is directed to a first pit, which may be one partitioned are of a larger collection tank. Fluid from the first pit is directed to a degasser which removes additional gases in the fluid and directs the fluid to a second pit. Fluid from the second pit is directed to a desilter, which removes additional solids and directs the fluid to a third pit. The solids from the desilter are directed to the solids collection container. Fluid from the third pit is directed to active rig pumps for recirculation into the borehole.

18 Claims, 7 Drawing Sheets

U.S. PATENT DOCUMENTS

| | | | |
|---|---|---|---|
| 5,236,605 A * | 8/1993 | Warncke | 210/799 |
| 5,582,727 A | 12/1996 | Foster | |
| 5,928,519 A | 7/1999 | Homan | |
| 6,269,880 B1 * | 8/2001 | Landry | 166/265 |
| RE38,367 E | 12/2003 | Southall | |
| 6,808,626 B2 | 10/2004 | Kulbeth | |
| 2005/0279715 A1 * | 12/2005 | Strong et al. | 210/774 |
| 2006/0070735 A1 * | 4/2006 | Guerra et al. | 166/267 |

* cited by examiner

MODULAR PRESSURE CONTROL AND DRILLING WASTE MANAGEMENT APPARATUS FOR SUBTERRANEAN BOREHOLE OPERATIONS

This application claims the benefit of U.S. Provisional Application No. 60/615,715 filed Oct. 4, 2004 and U.S. Provisional Application No. 60/615,730 filed Oct. 4, 2004, the contents of which are incorporated herein by reference.

BACKGROUND OF INVENTION

The rigs used to drill many oil and/or gas wells currently enjoy much smaller footprints than oil and/or gas wells of the past. Technology, such as coiled tubing operations, has led to a decrease in the space required to perform drilling and/or completion operations on oil or gas wells and a decrease in the time required to prepare for and to perform such operations.

Coiled tubing operations includes coiled tubing drilling, where downhole mud motors turn the bit to deepen a borehole. Coiled tubing drilling is useful in applications such as drilling slimmer wells and for areas where a small rig footprint is essential. In addition, coiled tubing operations are used in reentering wells and drilling underbalanced.

In underbalanced drilling, the amount of pressure (or force per unit area) exerted on a formation exposed in a borehole is less than the internal fluid pressure of that formation. If sufficient porosity and permeability exist, formation fluids enter the borehole.

Other coiled tubing operations involve coiled tubing services. Such services may include fracturing and completions to enhance the overall production of a well. Hydraulic fracturing is a stimulation treatment performed on oil and gas wells in low-permeability reservoirs. Specially engineered fluids are pumped into the portion of the reservoir to be treated at a high pressure and rate, causing a vertical fracture to open. Proppant, such as grains of sand of a particular size, is mixed with the treatment fluid to keep the fracture open when the treatment is complete.

In addition to coiled tubing operations, traditional drill-pipe operations have seen reductions in the area required to accommodate the equipment associated with drilling, completions, and production of a well. This is particularly true for offshore rigs where floor space is easily quantified.

As the space required for a drilling rig has decreased, the need has arisen for space allocated to various pieces of equipment and systems to also decrease. Further, the decrease in available space and time has accentuated the need for decreasing the footprint and preparation time for pressure control equipment and drilling waste management equipment as well as other associated equipment.

Using conventional drilling methods, the time required to position and assemble pressure control and drilling waste management equipment often requires days and available space to rig up. The time required to prepare the drilling equipment is typically days as well. To reduce overall costs associated with drilling an oil and/or gas well, there is a need to reduce the time and space required to position and assemble the pressure control and drilling waste management equipment in order to reduce the overall time to prepare a site for drilling. There is also a need to reduce the overall weight of the equipment to meet lift requirements. All of these needs must be met while continuing to maintain precise pressure controls, fluids processing efficiency, and drilling waste management in a closed loop process.

Another result of technological improvements in the field of drilling oil and gas wells is that there is less downtime and environmental impact during the actual drilling operation. Thus, the equipment used to provide pressure control and prepare the borehole fluid for reuse must be able to work nearly continuously in a closed loop design to promote zero discharge into the environment during the drilling operation. Proper equipment selection and placement is necessary to ensure continual operation without requiring additional space.

SUMMARY

In one aspect, the claimed subject matter is generally directed to a modularly segmented apparatus for removing waste from borehole fluid and recirculating the cleaned borehole fluid. The apparatus includes a pressure control section, a gas separator section, and a waste management section. In the pressure control section, a pressure manifold interconnects a plurality of chokes. A plurality of valves are used to direct the contaminated fluid through one of the chokes, which maintains the pressure in the system.

In the gas separator section, a has separator is used to remove a majority of the gases present in the contaminated borehole fluid.

In the waste management section, a vibratory separator removes large contaminants, such as cuttings, from the degassed borehole fluid. The large contaminants are directed to a solids collection container for further treatment or disposal. The borehole fluid is directed to a first pit, which may be one partitioned area of a larger collection tank. From the first pit, fluid is directed to a degasser where entrained gases are removed from the fluid. The fluid from the degasser is directed to a second pit in the collection tank. A pump is used to move the fluid from the second pit to a desilter where additional solids are removed from the fluid. The solids from the desilter are directed to the solids collection container and the fluid is directed to a third pit in the collection tank. The fluid from the third pit is directed to active rig pumps for recirculation into the borehole.

In another aspect of the claimed subject matter, a method for installing the apparatus includes lifting each section of equipment in fewer than six lifts from the transportation vessel or vehicle to the rig, affixing the pressure control section to the rig, positioning the collection tank and solids collection containers on the deck of the rig, affixing the tanks to the deck, positioning the vibratory separator, desilter, and degasser above the tanks, positioning the mud gas separator above the vibratory separator, plumbing the components into a closed loop.

Other aspects and advantages of the claimed subject matter will be apparent from the following description and the appended claims.

DETAILED DESCRIPTION

The claimed subject matter relates to a modular apparatus 100 for removing contaminants from a borehole fluid and a method for installing the apparatus. It will be appreciated by those of skill in the art that borehole fluids include drilling fluids, completion fluids, fracturing fluids, as well as other fluids that are circulated within subterranean boreholes during the various stages of drilling, completing, and maintaining a producing wellbore. As used herein, the term "subterranean borehole" includes boreholes in drilling, completion, and production operations. The apparatus includes three components, a pressure control section 110, a gas separator section 130, and a waste management section 160.

Figure 1:
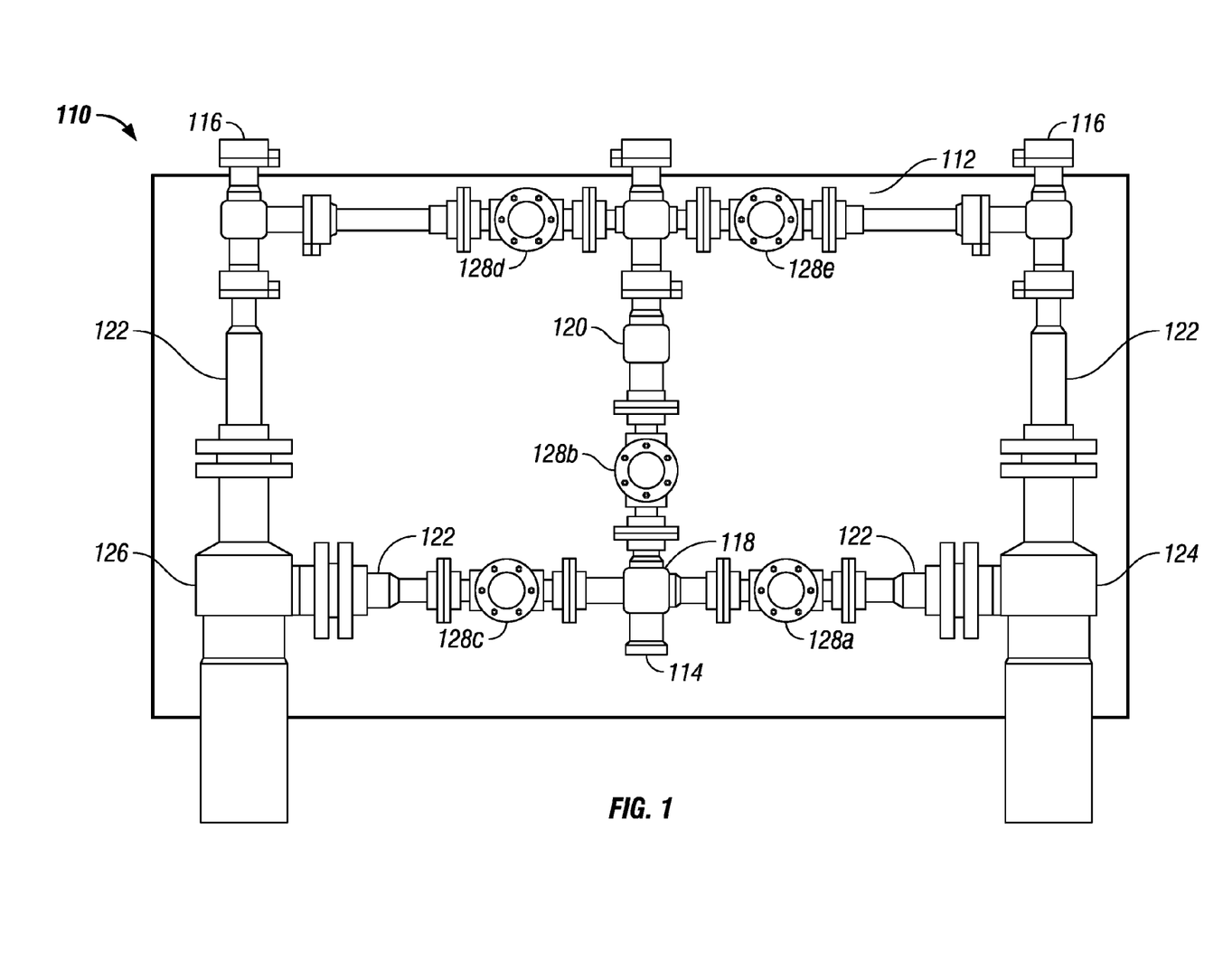
FIG. 1 is a top view of the pressure control section of the modular apparatus.

Referring to FIG. 1, the pressure control section 110 includes a pressure control manifold 118 interconnecting at least two chokes 124, 126. The chokes 124, 126 used in the pressure control section 110 are preferably automatic chokes, providing accurate pressure control.

A plurality of valves 128a–e are placed along the manifold 118 to selectively direct fluid through the pressure control section 110. The valves 128 may be selectively opened or closed to direct fluid through a first of the chokes 124. The second choke 126 is provided as a backup, or redundant, choke in the event that the first choke 124 becomes nonfunctional for any reason. Thus, if the first choke 124 is in need of repair or must undergo preventive maintenance requiring it to be taken off-line, the valves 128 may be used to redirect fluid flow to the second choke 126 while the first choke 124 is repaired or maintained and the drilling process may continue uninterrupted.

The manifold 118 may include a diverter line 120. The diverter line 120 may assist in providing a third flow path in the unlikely event that the two chokes 124, 126 fail or exceed capacity or pressure limitations. Machined blast joints 122 may be used to interconnect the chokes 124, 126 and valves 128.

The manifold 118, chokes 124, 126, and valves 128 are all mounted on a modular skid 112. As the entire pressure control section 110 is mounted on a single modular skid 112, it may be moved as a single piece to the desired location at the drilling site.

Used borehole fluid from the drilling operation is routed from the well to a pressure control section inlet 114. The valves 128a–c surrounding the inlet 114 will be opened or closed as needed to direct the used fluid through either the first choke 124 or the second choke 126. Upon exiting the first or second choke 124 or 126, the fluid will be directed to a pressure control section outlet 116. The valves 128 surrounding the outlet 116 will be opened or closed as needed to ensure that the used fluid exits the pressure control section 110.

In one embodiment, the chokes 124, 126 are capable of maintaining subterranean fluid pressure to within +/−50 psi of a predetermined pressure. The chokes may further include remote operating panels from which operators can set, monitor, and/or change the operating pressure within the subterranean borehole. An example of such a choke is the SUPER AUTOCHOKE™ available from M-I SWACO™.

Figure 2:
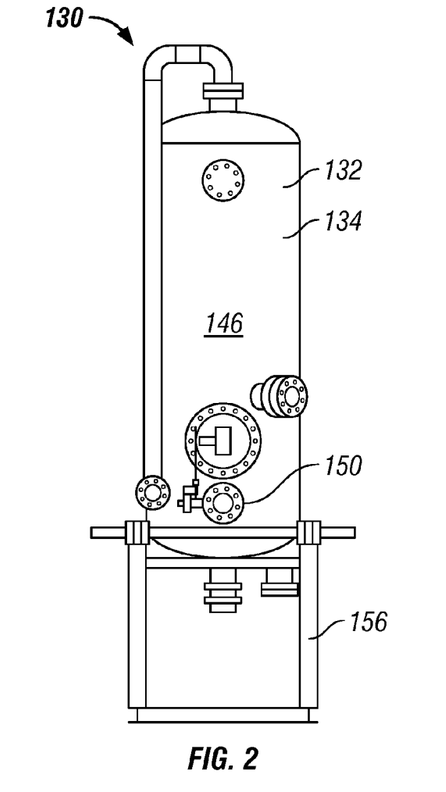
FIG. 2 is a front view of the gas separator section of the modular apparatus.
Figure 3:
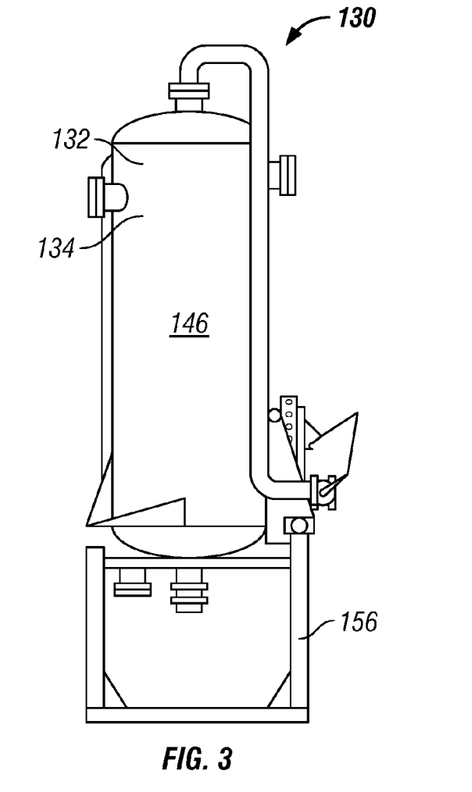
FIG. 3 is a side view of the gas separator section of the modular apparatus.
Figure 4:
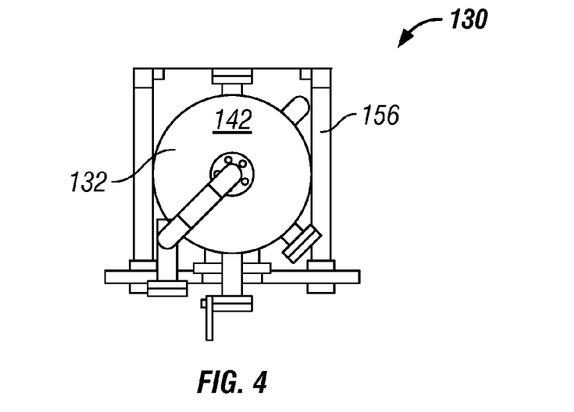
FIG. 4 is a top view of the gas separator section of the modular apparatus.
Figure 5:
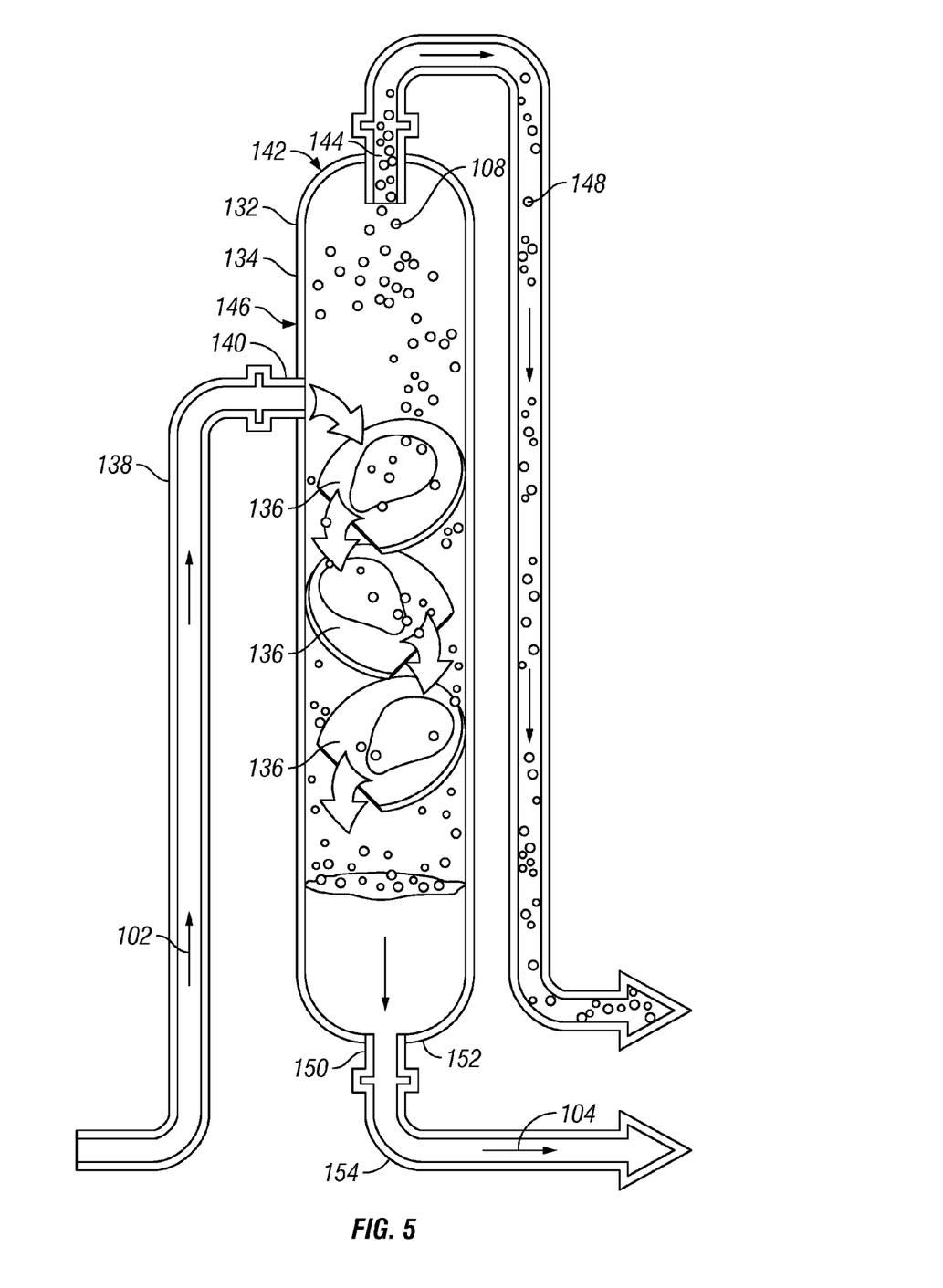
FIG. 5 is a schematic of the gas separator section.

Fluid from the pressure control section 110 is directed to a gas separator section 130. FIGS. 2–4 depict a typical gas separator 132. The gas separator 132 includes a tank 134 within which a series of baffles 136 (shown in FIG. 5) are contained. Referring to FIG. 5, the contaminated borehole fluid 102 is directed through a first pipe 138 to a tank inlet 140, located near the top 142 of the tank 134. Flow inside the tank 134 is tangential to the tank wall 146, resulting in a vortex effect. The borehole fluid 102 splashes over the series of baffles 136, causing entrained gases 108 to break free. The gases 108 are released through a vent 144 in the top 142 of the tank 134. A second pipe 148 directs the gases 108 to a flare line 215 (see FIG. 9) or other safe disposal area (not shown). The degassed borehole fluid 104 is directed to a separator outlet 150 located in the bottom 152 of the tank 134, as shown in FIG. 5. Alternatively, the separator outlet 150 may be located in the side of the tank 134, as shown in FIG. 2. A third pipe 154 directs the degassed borehole fluid 104 to the drilling waste management section 160 of the apparatus 100.

The gas separator 132 is equipped with a float to prevent overloading the separator 132 and discharge of the gas 108 over the waste management section 160.

Referring again to FIGS. 2–4, the gas separator 132 is mounted to a skid 156. The skid 156 permits the gas separator 132 to be easily positioned at the drilling site. Further, the skid 156 permits the gas separator 132 to be oriented so that the quantity of pipe 138, 148, and 154 required to fluidly connect the gas separator 132 to the pressure control section 110 and to the waste management section 160 is minimized. Degassed fluid 104 from the gas separator section 130 is gravity fed to the waste management section 160.

Figure 6:
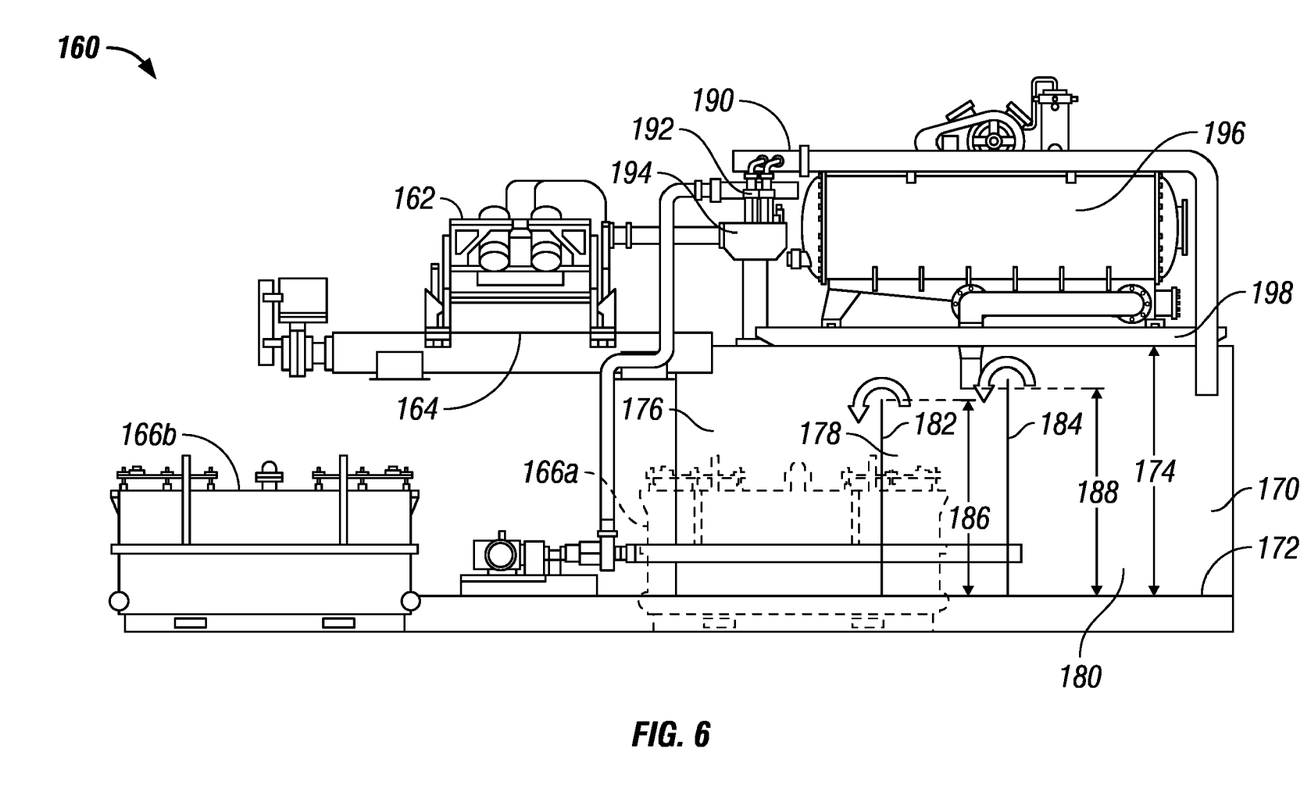
FIG. 6 is a front view of the waste management section of the modular apparatus.
Figure 7:
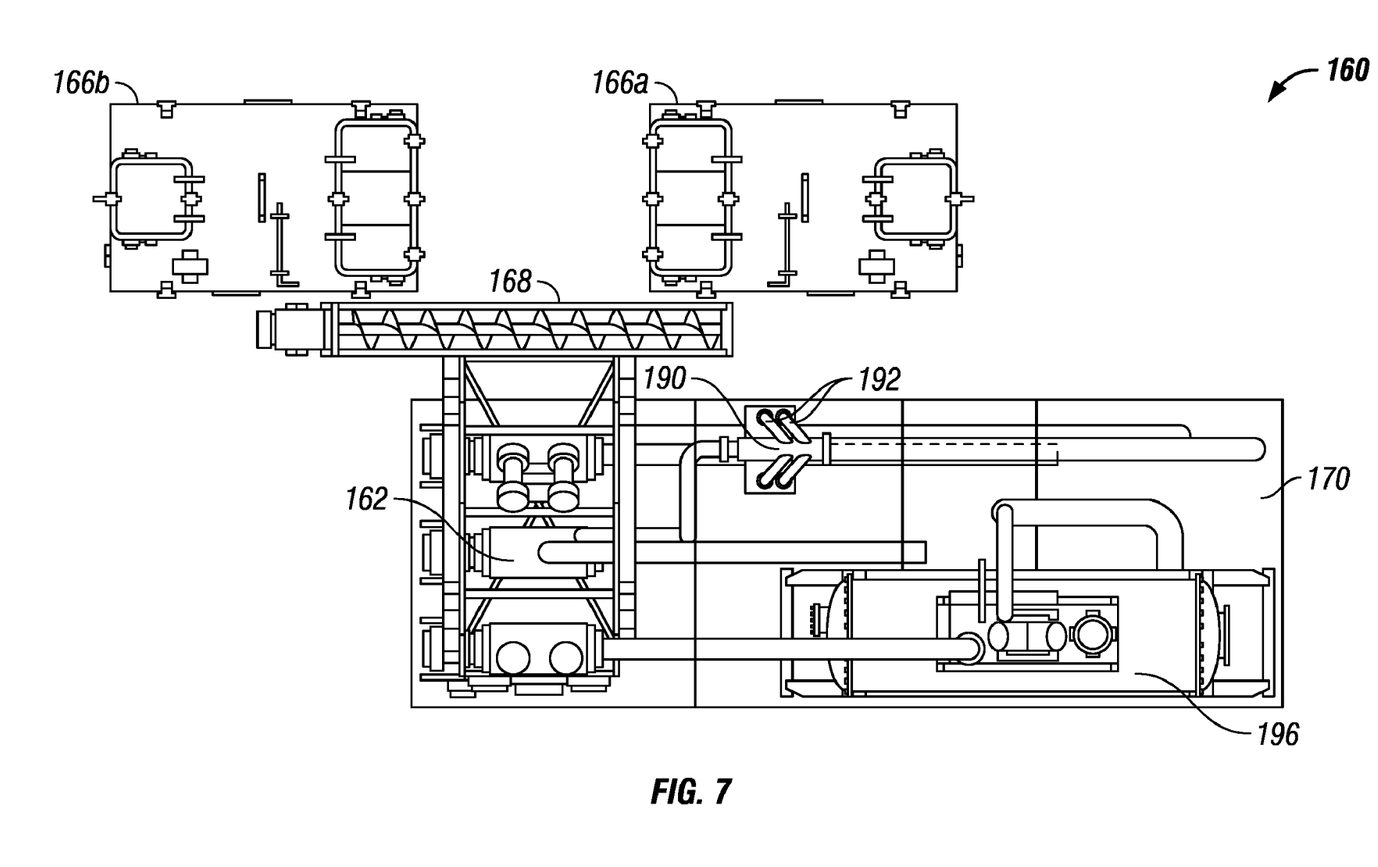
FIG. 7 is a schematic view of the waste management section of the modular apparatus.
Figure 8:
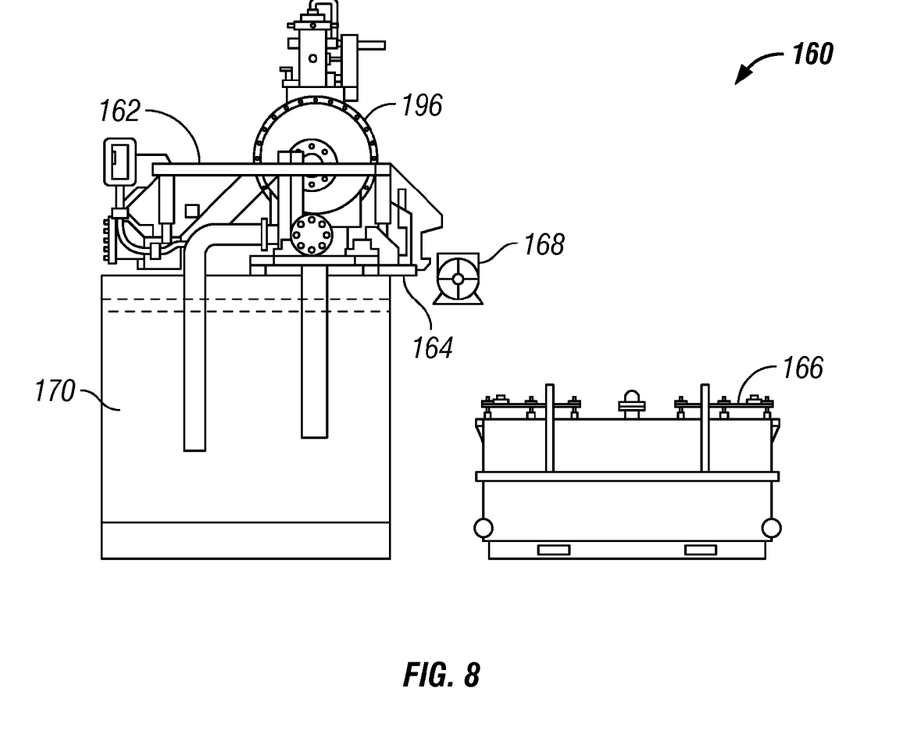
FIG. 8 is a side view of the waste management section of the modular apparatus.

Referring to FIGS. 6–8, the waste management section 160 includes a vibratory separator 162, at least one solids collection container 166, a desilter 190, a degasser 196, and a fluid collection tank 170.

The vibratory separator 162 receives degassed fluid from the gas separator section 130. A screen (not shown) is used to separate solids (not shown) of greater than a predetermined size from the fluid. The solids are then directed to a solids collection container 166.

The vibratory separator 162 is affixed to a modular skid 164 and is positioned at an elevation above the solids collection container 166 so that gravity may be used to move the separated solids from the vibratory separator 162 to the solids collection container 166. An auger 168 may be used also to move the solids to the solids collection container 166. Further, the auger 168 may be reversible so that a plurality of solids collection containers 166a, b may be used to receive solids. The auger 168 may be rotated in a first direction to feed a first solids collection container 166a until full. The rotation of the auger 168 may then be reversed to direct the solids to a second solids collection container 166b located near the opposite end of the auger 168. Thus, by reversing rotation of the auger 168 and filling another solids collection tank 166b the first solids collection container 166a may be removed and replaced without stopping the drilling process.

The fluid from the vibratory separator 162 is directed to a first pit 176 within the partitioned fluid collection tank 170. The fluid collection tank 170, located at an elevation lower than the vibratory separator 162, is partitioned into at least three pits 176, 178, 180. The fluid collected in the first pit 176 is pumped to a desilter 190, located at a higher elevation than the fluid collection tank 170.

The desilted fluid from the first pit 176 is pumped to a degasser 196, located at a higher elevation than the fluid collection tank 170. The degasser 196 removes entrained gases that were not removed in the gas separator section 130 by pumping the fluid over an internal baffle under a vacuum. From the degasser 196, the degassed fluid is directed to a second pit 178 in the fluid collection tank 170. The gases removed from the fluid are vented. The gases may be directed to the second pipe 148 from the gas separator 132 (shown in FIG. 5), which guides the gases to a flare line (not shown).

The degasser 196 is affixed to a modular skid 198. The skid 198 allows the degasser 196 to be conveniently located over the fluid collection tank 170 such that the fluid is directed to the second pit 178 without unnecessary piping.

The desilter 190 is used to remove additional solids from the fluid pumped from the second pit 178. The fluid is directed through a plurality of hydrocyclones 192 where the solids not separated by the vibratory separator 162 are forced toward the inside surface of the hydrocyclone 192. The solids spiral downward and are discharged by the hydrocyclones 192 into a trough 194. The trough 194 may direct the solids, much of which has been compressed to form a larger solid, back to the vibratory separator 162 for drying and reclamation of uncontaminated borehole fluid. Alternatively, the solids separated by the desilter 190 may be directed to one of the solids collection containers 166a or 166b. The desilted fluid is directed to a third pit 180 of the fluid collection tank 170.

A first partition 182 separates the first pit 176 and the second pit 178. The first partition 182 extends from the tank floor 172 to a first partition height 186 that is less than the tank height 174 of the fluid collection tank 170. The second pit 178 has a second pit fluid capacity dependent upon the first partition height 186. Thus, it is possible for fluid to be communicated between the first and second pits 176, 178 when fluid into the second pit 178 exceeds the second pit fluid capacity.

The second partition 184, separating the second pit 178 from the third pit 180, has a second partition height 188 that is less than the tank height 174 but greater than the first partition height 186. Thus fluid may be communicated from the third pit 180 into the second pit 178. The third pit 180 has a third pit fluid capacity dependent upon the second partition height 188. When fluid into the third pit 180 exceeds the third pit fluid capacity, fluid will overflow the second partition 184 and be communicated to the second pit 178. Under normal operating conditions, fluid will not be communicated from the second pit 178 to the third pit 180, as the first partition 182 is shorter than the second partition 184. Fluid overflow from the second pit 178 will first be communicated to the first pit 176. It would only be when the first and second pits 176, 178 are full that the fluid would be communicated into the third pit 180 from the second pit 178.

Fluid from the third pit 180 is pumped to the active rig pumps for recirculation down the borehole. Because the first and second partition heights 186, 188 differ, overflow fluid from the third pit 180 is directed to the second pit 178 and is continually recirculated through the degasser 196 to ensure all entrained gases are removed from the fluid.

As one of skill in the art can appreciate, the apparatus 100 described may be used in the operation of many types of subterranean activities. The pressure control and waste management capabilities of the apparatus 100 may be effectively used in coiled tubing operations such as drilling, fracturing, completion, and underbalanced drilling. The apparatus 100 may also be effectively used for well intervention and managing the waste and pressure associated with traditional drill pipe operations. The modular design provides flexibility for placement near the borehole. As previously described, the pressure control section 110 provides redundant pressure control for subterranean borehole fluids. The waste management section 160 provides a closed loop process for removing solids and gases from borehole fluids and returning them to the borehole.

Figure 9:
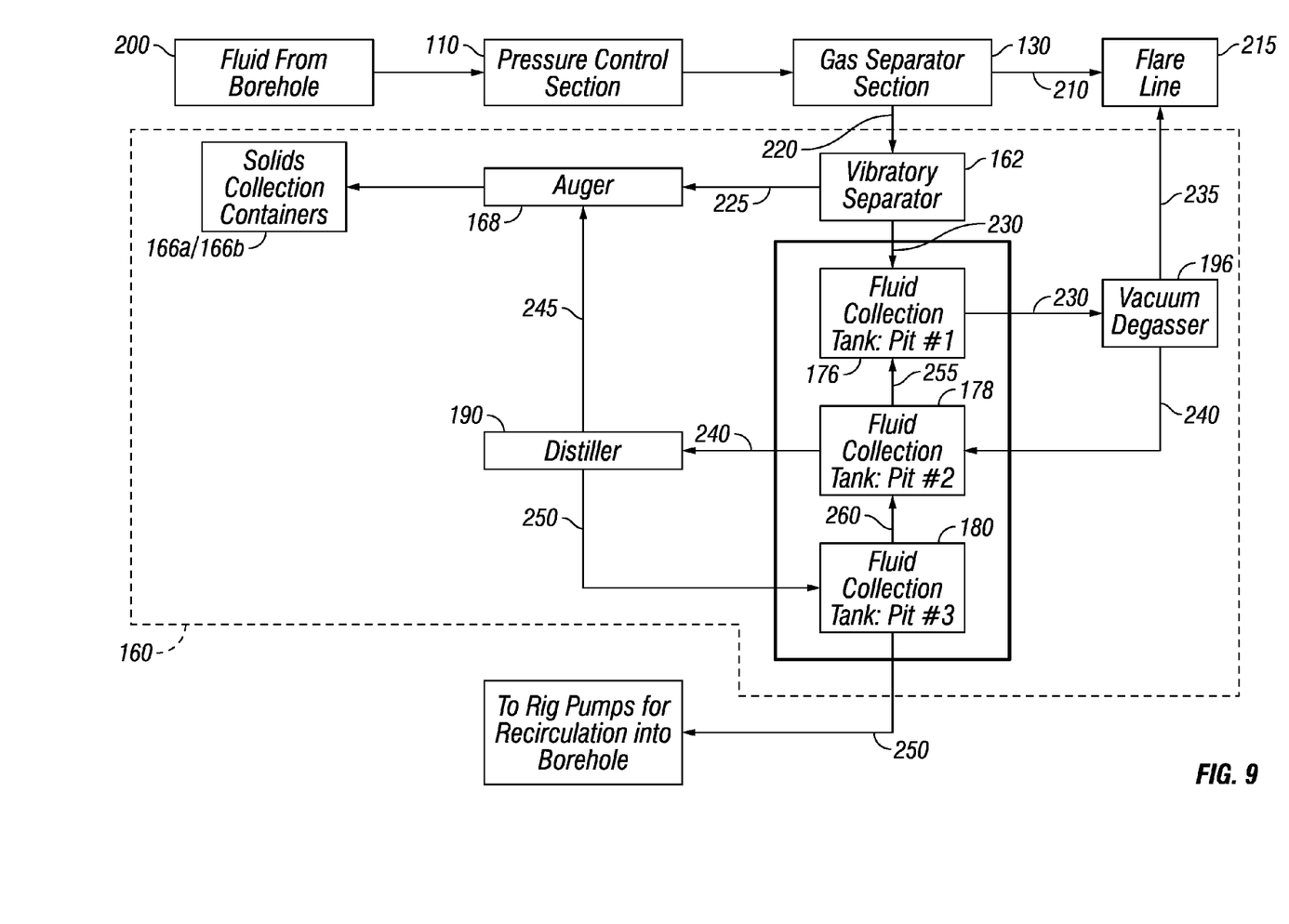
FIG. 9 is a process flow chart of the pressure control and waste management apparatus.

Referring to FIG. 9, the process performed by the apparatus is schematically demonstrated. Fluid pressure of the fluid 200 in the borehole is maintained by pressure control section 110. The fluid 200 from the borehole is directed through the pressure control section 110 to the gas separator section 130. Gases 210 released from the fluid are vented via a flare line 215. The degassed fluid 220 is directed to the waste management section 160. The vibratory separator 162 separates large solids 225 from the degassed fluid 220. The separated solids 225 are directed via an auger 168 to a solids collection container 166a or b. Fluid 230 from the separator 162 is directed into a first pit 176 of the fluid collection tank 170. The fluid 230 is then directed to a degasser 196 where additional entrained gases 235 are removed and vented. The degassed fluid 240 is directed to a second pit 178 of the fluid collection tank 170. From the second pit 178, the fluid 240 is directed to a desilter 190, which removes additional finer solids 245 from the fluid 240. The solids 245 removed by the desilter 190 are directed to the solids collection container 166a or b. The desilted fluid 250 is directed to a third pit 180 of the fluid collection tank 170. From the third pit 180, the fluid 250 is recirculated into the borehole. When fluid 240 into the second pit 178 exceeds the capacity of the second pit 178, overflow 255 is directed to the first pit 176. Likewise, when fluid 250 directed to the third pit 180 exceeds the capacity of the third pit 180, overflow 260 is directed to the second pit 178. Thus, when fluid 255 or 260 overflows to previous pit 176 or 178, respectively, the fluid is degassed or desilted a second time before ultimately being returned to the borehole.

The apparatus 100 described may be easily transported to the drill site and plumbed. The fluid collection tank 170 and the solids collection containers 166a, b are positioned at elevations below the elevations of the vibratory separator 162, the desilter 190, and the degasser 196. The vibratory separator 162 is located at an elevation below the gas separator 132 and the desilter 190, as both of these units use gravity to feed the vibratory separator 162. The auger 168, if included, is positioned such that it is fed from the vibratory separator 162 by gravity and such that it feeds the solids collection containers 166a, b by gravity. Thus, the auger 168 must be located at an elevation below the solids discharge of the vibratory separator 162 and above the opening of the solids collection containers 166a, b.

To prepare the apparatus 100, the skid mounted equipment is remove from the transportation provider and placed at the rig location. Because the equipment is affixed to modular skids prior to transport, only six lifts are required to accomplish this. The equipment located at lower elevations, i.e. the fluid collection tank 170 and the solids collection container 166, is removed and placed at the site first. The desilter 190 and degasser 196 may be moved next and plumbed to the corresponding pits 176, 178, 180 in the fluid collection tank 170. Next, the vibratory separator 162 and auger 168 may be positioned and aligned appropriately. Finally, the gas separator section 130 and the pressure control section 110 may be positioned and plumbed to the equipment already assembled.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for controlling operating pressure in and managing waste from a subterranean borehole, said apparatus comprising:
   a pressure control section comprising:
      a choke manifold having an inlet in fluid communication with the subterranean borehole and an outlet;
      a plurality of choke assemblies selectively in fluid communication with the choke manifold;
      a plurality of valves along the choke manifold operable to selectively direct flow through the manifold and to one of the plurality of choke assemblies;
      wherein each choke is independently operable to control the operating pressure in the subterranean borehole;
   a gas separator section in fluid communication with the choke manifold outlet, said gas separator section comprising:
      a gas separator operable to remove gases present in the fluid from the choke manifold and discharge a degassed fluid;
   a waste management section comprising:
      a vibratory separator receiving the degassed fluid from the gas separator and removing solids from the degassed fluid and discharging fluid;
      a collection tank having a plurality of pits therein defined by a plurality of spaced apart partitions, wherein a first pit is in fluid communication with a fluid discharge of the vibratory separator;
      a degasser receiving fluid from the first pit and operable to remove gases entrained in the fluid while communicating degassed fluid to a second pit of the collection tank;
      a desilter receiving fluid from the second pit and operable to remove additional solids and communicate desilted fluid to a third pit of the collection tank;
      wherein the third pit of the collection tank is in fluid communication with the subterranean borehole.

2. The apparatus of claim 1 further comprising:
   at least one solids collection container receiving solids from the vibratory separator and receiving solids from the desilter.

3. The apparatus of claim 1 further comprising:
   a pair of solids collection containers;
   a reversible auger receiving solids from the vibratory separator and receiving solids from the desilter;
   wherein the reversible auger is operable to selectively communicate received solids to one of the solids collection containers; and
   wherein the reversible auger is further operable to selectively communicate received solids to a second of the solids collection containers.

4. The apparatus of claim 1, wherein the manifold further comprises:
   a diverter line in selective fluid communication with the borehole and the gas separator section;
   wherein the diverter line redirects flow from the borehole to the gas separator section when fluid pressure exceeds a pressure limitation of one of the chokes.

5. The apparatus of claim 1, wherein the second pit has a second pit fluid capacity; and
   wherein fluid directed to the second pit in excess of the second pit fluid capacity is communicated to the first pit.

6. The apparatus of claim 5, wherein the third pit has a third pit fluid capacity; and
   wherein fluid directed to the third pit in excess of the third pit fluid capacity is communicated to the second pit.

7. An apparatus for controlling operating pressure in and managing waste from a subterranean borehole, said apparatus comprising:
   a pressure control section in fluid communication with the subterranean borehole and operable to control operating pressure of fluid therein, wherein the fluid includes solids and entrained gases;
   a gas separator section in fluid communication with the pressure control section and operable to remove the entrained gases from the fluid;
   a waste management section in fluid communication with the gas separator section and operable to separate solids and any remaining entrained gases from the fluid; and
   wherein the waste management section further comprises:
      a vibratory separator receiving the degassed fluid from the gas separator section;
      a collection tank having a plurality of pits therein defined by a plurality of spaced apart partitions, wherein a first pit receives separated fluid from the vibratory separator;
      a degasser receiving fluid from the first pit, removing gases entrained in the fluid, and communicating degassed fluid to a second pit of the collection tank;
      a desilter receiving fluid from the second pit, removing additional solids from the fluid, and directing solids to a solids collection area and communicating desilted fluid to a third pit of the collection tank;
      wherein the third pit of the collection tank is in fluid communication with the subterranean borehole.

8. The apparatus of claim 7, wherein the pressure control section further comprises:
   a choke manifold having an inlet in fluid communication with the subterranean borehole and an outlet;
   a plurality of choke assemblies selectively in fluid communication with the choke manifold
   a plurality of valves along the choke manifold operable to selectively direct flow through the manifold and to one of the plurality of choke assemblies;
   wherein each choke is operable to control the operating pressure in the subterranean borehole.

9. The apparatus of claim 8, wherein the manifold further comprises:
   a diverter line in selective fluid communication with the borehole and the gas separator section
   wherein the diverter line redirects flow from the borehole to the gas separator section when fluid pressure exceeds a pressure limitation of one of the chokes.

10. The apparatus of claim 7, wherein the gas separator section further comprises:
    a gas separator operable to remove gases present in the fluid from the choke manifold and discharge a degassed fluid to the waste management section.

11. The apparatus of claim 7, wherein a first partition having a first partition height separates the first pit and the second pit in the collection tank and the second pit has a corresponding fluid capacity; and wherein fluid is communicated to the first pit from the second pit over the first partition when fluid in excess of the fluid capacity of the second pit is directed to the second pit.

12. The apparatus of claim 11, wherein a second partition having a second partition height separates the third pit and the second pit in the collection tank and the third pit has a corresponding fluid capacity; and
wherein fluid is communicated to the second pit from the third pit over the second partition when a fluid in excess of the fluid capacity of the third pit is directed to the third pit.

13. The apparatus of claim 7, further comprising:
a solids collection container receiving separated solids from the vibratory separator and the desilter.

14. The apparatus of claim 7, further comprising:
a first solids collection container;
a second solids collection container;
a reversible auger;
wherein separated solids from the vibratory separator and the desilter are directed to the reversible auger; and
wherein the reversible auger rotates in a first direction to communicate solids to the first solids collection container and rotates in a second direction to communicate solids to the second solids collection container.

15. A closed-loop system for managing borehole fluid for a subterranean borehole comprising:
a pressure control section in fluid communication with the subterranean borehole and operable to control the pressure of the fluid within the subterranean borehole;
a gas separator section receiving fluid from the pressure control system and operable to remove gases from the fluid;
a waste management section receiving fluid from the gas separator section and removing solids and additional gases therefrom;
wherein the waste management section comprises:
a vibratory separator receiving the degassed fluid from the gas separator section;
a collection tank having a plurality of pits therein defined by a plurality of spaced apart partitions, wherein a first pit receives the discharge fluid from the vibratory separator;
a degasser receiving fluid from the first pit, removing gases entrained in the fluid, and communicating degassed fluid to a second pit of the collection tank;
wherein the second pit has a second pit fluid capacity;
wherein fluid directed to the second pit in excess of the second pit fluid capacity is communicated to the first pit;
a desilter receiving fluid from the second pit, removing additional solids from the fluid, and directing solids to a solids collection area and communicating desilted fluid to a third pit of the collection tank;
wherein the third pit of the collection tank is in fluid communication with the subterranean borehole;
wherein the third pit has a third pit fluid capacity; and
wherein fluid directed to the third pit in excess of the third pit fluid capacity is communicated to the second pit.

16. The closed-loop system of claim 15, wherein the pressure control section further comprises:
a choke manifold in fluid communication with the subterranean borehole;
a pair of chokes in fluid communication with the choke manifold, wherein each choke is independently operable to maintain a predetermined fluid pressure for fluid in the subterranean borehole; and
a plurality of valves selectively operable to direct fluid to one or the other of the pair of chokes such that one of the chokes is in fluid communication with the subterranean borehole.

17. The closed-loop system of claim 16, further comprising:
a diverter line selectively in fluid communication with the subterranean borehole and operable to divert fluid flow when fluid pressure exceeds a maximum pressure.

18. The apparatus of claim 15 further comprising:
a first solids collection container;
a reversible auger receiving solids from the vibratory separator and receiving solids from the desilter;
wherein the reversible auger is operable to selectively communicate received solids to the first solids collection container;
a second solids collection container; and
wherein the reversible auger is further operable to selectively communicate received solids to the second solids collection container.

* * * * *